(12) United States Patent
Miyamoto et al.

(10) Patent No.: US 9,732,498 B2
(45) Date of Patent: Aug. 15, 2017

(54) WORK VEHICLE AND CONTROL METHOD FOR WORK VEHICLE

(71) Applicant: KOMATSU LTD., Tokyo (JP)

(72) Inventors: Shunsuke Miyamoto, Atsugi (JP); Yasunori Ohkura, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/030,439

(22) PCT Filed: Dec. 17, 2014

(86) PCT No.: PCT/JP2014/083431
§ 371 (c)(1),
(2) Date: Apr. 19, 2016

(87) PCT Pub. No.: WO2015/114979
PCT Pub. Date: Aug. 6, 2015

(65) Prior Publication Data
US 2016/0251828 A1 Sep. 1, 2016

(30) Foreign Application Priority Data
Jan. 31, 2014 (JP) .................................. 2014-016829

(51) Int. Cl.
*E02F 9/20* (2006.01)
*B60K 6/365* (2007.10)
(Continued)

(52) U.S. Cl.
CPC .............. *E02F 9/2075* (2013.01); *B60K 6/28* (2013.01); *B60K 6/365* (2013.01); *B60K 6/48* (2013.01);
(Continued)

(58) Field of Classification Search
CPC ...... B60W 10/06; B60W 10/08; B60W 20/00; Y02T 10/6286; Y02T 10/6239; B60K 6/365; B60K 6/445; Y10T 477/23
(Continued)

(56) References Cited

U.S. PATENT DOCUMENTS

| 2008/0234915 A1* | 9/2008 | Nomasa | B60K 6/365 |
| | | | 701/102 |
| 2008/0318727 A1* | 12/2008 | Matsubara | B60K 6/445 |
| | | | 477/3 |

(Continued)

FOREIGN PATENT DOCUMENTS

| JP | 2002-359935 A | 12/2002 |
| JP | 2006-136131 A | 5/2006 |

(Continued)

OTHER PUBLICATIONS

The International Search Report for the corresponding international application No. PCT/JP2014/083431, issued on Mar. 24, 2015.

*Primary Examiner* — Mussa A Shaawat
*Assistant Examiner* — Sanjeev Malhotra
(74) *Attorney, Agent, or Firm* — Global IP Counselors, LLP

(57) ABSTRACT

A power transmission device of a work vehicle includes a generator, a motor, and an energy storage unit. The energy storage unit stores electricity generated by the generator. A forward/backward travel switch operation device receives an instruction for forward or backward travel from an operator. A vehicle speed detection unit detects the speed of the vehicle. A control unit includes an energy management requirement determination unit. The energy management requirement determination unit determines, on the basis of the difference between a target electricity storage amount and a current electricity storage amount in the energy storage unit, the energy management required power required by the
(Continued)

power transmission device for charging the energy storage unit. The energy management requirement determination unit increases the target electricity storage amount when a first travel direction according to the instruction and a second travel direction determined from the vehicle speed are different.

17 Claims, 9 Drawing Sheets

(51) Int. Cl.
| | |
|---|---|
| B60K 6/48 | (2007.10) |
| B60K 6/543 | (2007.10) |
| B60L 11/14 | (2006.01) |
| B60W 10/08 | (2006.01) |
| B60W 10/10 | (2012.01) |
| B60W 10/26 | (2006.01) |
| B60W 20/00 | (2016.01) |
| F16H 3/66 | (2006.01) |
| F16H 3/72 | (2006.01) |
| B60L 11/00 | (2006.01) |
| B60L 11/18 | (2006.01) |
| B60L 15/20 | (2006.01) |
| B60K 6/28 | (2007.10) |
| E02F 9/22 | (2006.01) |
| F16H 37/10 | (2006.01) |
| E02F 3/28 | (2006.01) |

(52) U.S. Cl.
CPC ............ *B60K 6/543* (2013.01); *B60L 11/005* (2013.01); *B60L 11/14* (2013.01); *B60L 11/1861* (2013.01); *B60L 15/2009* (2013.01); *B60L 15/2045* (2013.01); *B60L 15/2054* (2013.01); *B60W 10/08* (2013.01); *B60W 10/10* (2013.01); *B60W 10/26* (2013.01); *B60W 20/00* (2013.01); *E02F 9/202* (2013.01); *E02F 9/2079* (2013.01); *E02F 9/2091* (2013.01); *E02F 9/2253* (2013.01); *F16H 3/66* (2013.01); *F16H 3/72* (2013.01); *F16H 3/728* (2013.01); *B60L 2200/36* (2013.01); *B60L 2200/40* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2250/24* (2013.01); *B60L 2250/26* (2013.01); *B60Y 2200/415* (2013.01); *B60Y 2400/11* (2013.01); *B60Y 2400/73* (2013.01); *E02F 3/283* (2013.01); *E02F 9/2285* (2013.01); *E02F 9/2292* (2013.01); *E02F 9/2296* (2013.01); *F16H 2037/101* (2013.01); *F16H 2200/2007* (2013.01); *F16H 2200/2041* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7241* (2013.01); *Y02T 10/7283* (2013.01)

(58) Field of Classification Search
USPC ........ 701/102; 477/3, 83; 290/1 R; 180/68.1
See application file for complete search history.

(56) References Cited

U.S. PATENT DOCUMENTS

| | | | |
|---|---|---|---|
| 2009/0105028 A1 | 4/2009 | Hiraki et al. | |
| 2011/0285147 A1* | 11/2011 | Fyke | H02J 3/28 290/1 R |
| 2012/0241235 A1* | 9/2012 | Shintani | E02F 9/2095 180/68.1 |
| 2014/0221156 A1* | 8/2014 | Sugimura | B60W 10/06 477/83 |

FOREIGN PATENT DOCUMENTS

| | | |
|---|---|---|
| JP | 2006329244 A | 12/2006 |
| JP | 2012-90404 A | 5/2012 |
| WO | 2013/084682 A1 | 6/2013 |

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2014/083431, filed on Dec. 17, 2014. This U.S. National stage application claims priority under 35 U.S.C. §119(a) to Japanese Patent Application No. 2014-016829, filed in Japan on Jan. 31, 2014, the entire contents of which are hereby incorporated herein by reference.

BACKGROUND

Field of the Invention

The present invention relates to a work vehicle and a control method for the work vehicle.

Background Information

Recently, a hybrid-type work vehicle has been proposed that travels using both an engine and a motor. The above-mentioned hybrid-type power transmission device demonstrates the advantage of having an energy recovery function and good fuel consumption in comparison to a conventional power transmission device (referred to below as a "torque converter-type speed variator") having a torque converter and a multi-stage speed variator. A hydraulic-mechanical transmission (HMT) or an electric-mechanical transmission (EMT) is disclosed as the hybrid-type power transmission device for work vehicles as in, for example, Japanese Laid-Open Patent Publication No. 2006-329244.

The HMT includes a planetary gear mechanism, and a first pump/motor and a second pump/motor connected to a rotating element of the planetary gear mechanism. The first pump/motor and the second pump/motor function as either hydraulic motors or hydraulic pumps in response to the travel state of the work vehicle. The HMT is configured to enable stepless changing of the rotation speed of the output shaft by changing the rotation speed of the pump/motors.

An electric motor is used in the EMT in place of the hydraulic motor in the HMT. Specifically, the EMT includes a first generator/motor and a second generator/motor. The first and second generator/motors function as either electric motors or electric generators in response to the travel state of the work vehicle. Similar to the HMT, the EMT is configured to enable stepless changing of the rotation speed of the output shaft by changing the rotation speed of the generator/motors.

The hybrid-type work vehicle typically generates electricity with the electric motor during low loads or during braking, stores the electricity in an energy storage unit such as a capacitor/battery and the like, and uses the electrical power of the energy storage unit to drive the electric motor during high loads. Consequently, the work vehicle is able to reduce fuel consumption with the engine. Japanese Laid-Open Patent Publication No. 2002-359935 discloses a hybrid-type work vehicle that appropriately changes the range of appropriate electricity storage amounts from the potential energy of the work implement and from the kinetic energy of a revolving body, whereby the electricity storage amount does not exceed an upper or lower limit even when the capacity of the energy storage unit is small. Based on a maximum value and a minimum value of the electricity storage amount in the energy storage unit, the upper and lower limits are set to as to be provided with a margin so that overcharging and overdischarging do not occur even when overshooting or undershooting occurs due to the control of the electricity storage amount.

SUMMARY

The electricity storage amount in Japanese Laid-Open Patent Publication No. 2002-359935 is controlled by taking into consideration the potential energy of the work implement and the kinetic energy of the revolving body. However, it is difficult to use the potential energy and the kinetic energy applied to the movement of the travel device of the work vehicle in the same way. A work vehicle is not limited to traveling on a road and the work vehicle travels on road surfaces having large differences in height when performing excavating work or loading work, and therefore it is difficult to predict the potential energy or the kinetic energy ahead of time.

An object of the present invention is to provide a hybrid-type work vehicle that demonstrates superior fuel consumption performance by predicting, from the state of the work vehicle, an ideal electricity storage amount that efficiently makes use of the capacity of an energy storage unit.

A work vehicle according to a first aspect of the present invention is equipped with an engine, a hydraulic pump, a work implement, a travel device, a power transmission device, a forward/backward travel switch operation device, a vehicle speed detecting unit, and a control unit. The hydraulic pump is driven by the engine. The work implement is driven by hydraulic fluid discharged from the hydraulic pump. The power transmission device transmits driving power from the engine to the travel device. The forward/backward travel switch operation device receives an instruction for forward or backward travel from an operator. The vehicle speed detecting unit detects the vehicle speed of the travel device. The control unit controls the power transmission device. The power transmission device includes an input shaft, an output shaft, a generator, a motor, and an energy storage unit. The generator receives driving power from the engine. The motor outputs driving power to the travel device. The energy storage unit stores electricity generated by the generator. The power transmission device is configured to change a rotation speed ratio of the output shaft with respect to the input shaft by changing the rotation speed of the motor.

The control unit includes an energy management requirement determination unit. The energy management requirement determination unit determines, on the basis of the difference between a target electricity storage amount and a current electricity storage amount in the energy storage unit, an energy management required power required by the power transmission device for charging the energy storage unit. The energy management requirement determination unit increases the target electricity storage amount when a first travel direction according to the instruction from the operator that is received from the forward/backward travel switch operation device, and a second travel direction determined from the vehicle speed detected by the vehicle speed detecting unit, are different.

The energy management requirement determination unit may increase the energy management required power when the first travel direction and the second travel direction are different.

The energy management requirement determination unit may determine the target electricity storage amount on the basis of the vehicle speed.

The energy management requirement determination unit may change the target electricity storage amount in response to the vehicle speed when the first travel direction and the second travel direction match.

The energy management requirement determination unit may reduce the target electricity storage amount in correspondence to an increase in the absolute value of the vehicle speed when the first travel direction and the second travel direction match.

The energy management requirement determination unit may reduce the energy management required power in correspondence to a decrease in the difference between the target electricity storage amount and the current electricity storage amount.

The energy management requirement determination unit may determine the energy management required power for discharging the energy storage unit when the current electricity storage amount exceeds the target electricity storage amount.

The energy storage unit may be a capacitor.

The power transmission device may include an F-clutch, an R-clutch, and a gear mechanism. The generator and the motor may be connected to rotating elements of the gear mechanism.

A control method according to a second aspect of the present invention is a control method for a work vehicle. The work vehicle is equipped with an engine, a hydraulic pump, a work implement, a travel device, a power transmission device, a forward/backward travel switch operation device, and a vehicle speed detecting unit. The hydraulic pump is driven by the engine. The work implement is driven by hydraulic fluid discharged from the hydraulic pump. The power transmission device transmits driving power from the engine to the travel device. The forward/backward travel switch operation device receives an instruction for forward or backward travel from an operator. The vehicle speed detecting unit detects the vehicle speed of the travel device. The power transmission device includes an input shaft, an output shaft, a generator, a motor, and an energy storage unit. The generator receives driving power from the engine. The motor outputs driving power to the travel device. The energy storage unit stores electricity generated by the generator. The power transmission device is configured to change a rotation speed ratio of the output shaft with respect to the input shaft by changing the rotation speed of the motor.

The control method includes a first step for determining, on the basis of the difference between a target electricity storage amount and a current electricity storage amount in the energy storage unit, an energy management required power required by the power transmission device for charging the energy storage unit. The first step includes a second step for increasing the target electricity storage amount when a first travel direction according to an instruction from the operator that is received from the forward/backward travel switch operation device, and a second travel direction determined from the vehicle speed detected by the vehicle speed detecting unit, are different.

According to exemplary embodiments of the present invention, the target electricity storage amount is increased when the first travel direction and the second travel direction are different. An operation of the work vehicle in which the first travel direction and the second travel direction become different is called a shuttle action. After decelerating, the speed is then increased in the first travel direction in the shuttle action. Consequently, the electricity received during the deceleration is quickly used during the subsequent acceleration. Therefore, overcharging or overdischarging when the electricity storage amount exceeds the upper or lower limits is not brought about even when the electricity storage amount increases during deceleration and is charged so as to be close to the maximum electricity storage amount of the energy storage unit. Consequently, the energy recovery amount increases and fuel consumption performance of the work vehicle improves.

DETAILED DESCRIPTION OF EXEMPLARY EMBODIMENTS

Figure 1:
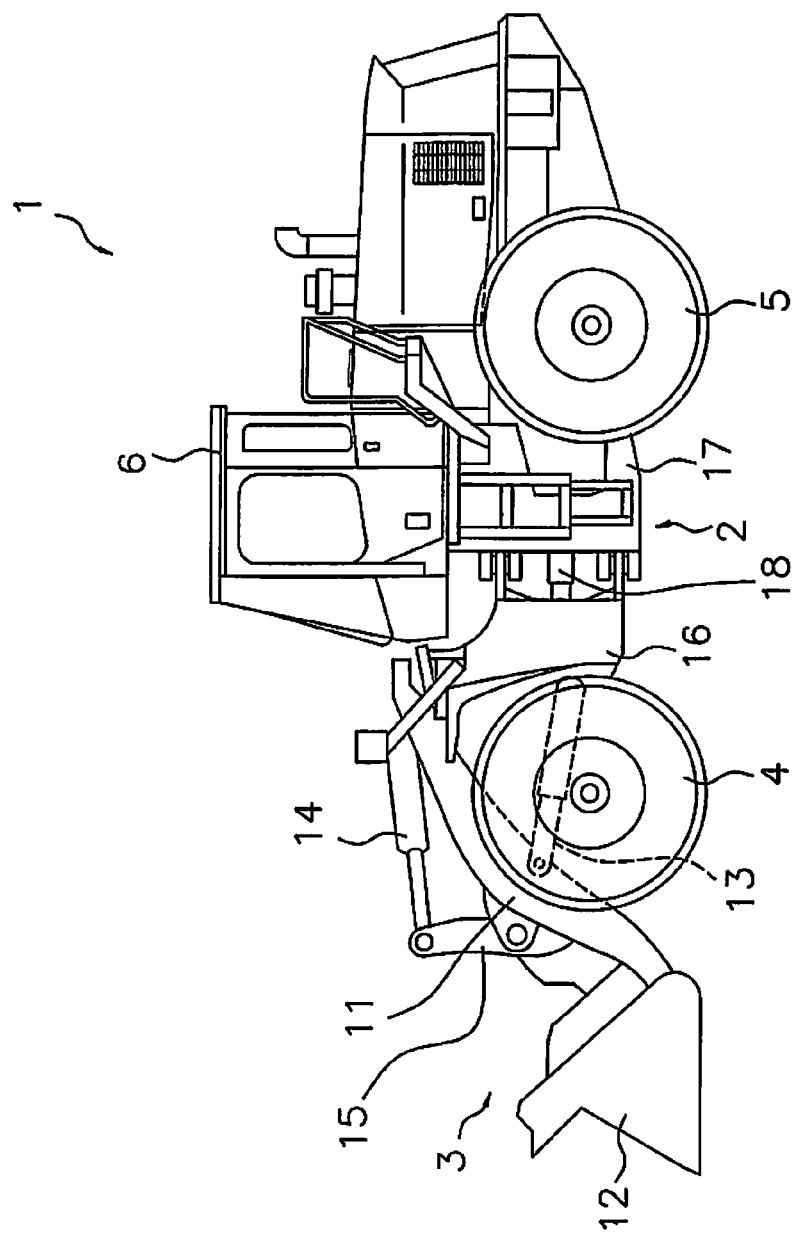
FIG. 1 is a side view of a work vehicle according to an exemplary embodiment.

An exemplary embodiment of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The vehicle body frame 2 includes a front frame 16 and a rear frame 17. The front frame 16 and the rear frame 17 are attached to each other in a manner that allows tilting in the left-right direction. The work implement 3 and the traveling wheels 4 are attached to the front frame 16. The work implement 3 is driven by hydraulic fluid from a below-mentioned work implement pump 23 (see FIG. 2). The work implement 3 includes a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. The boom 11 swings up and down due to the extension and contraction of the lift cylinder 13 with hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 with hydraulic fluid from the work implement pump 23.

The operating cabin 6 and the traveling wheels 5 are attached to the rear frame 17. The operating cabin 6 is mounted on the vehicle body frame 2. A seat for the operator and a below-mentioned operating device are disposed in the operating cabin 6.

The work vehicle 1 includes a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned steering pump 30.

Figure 2:
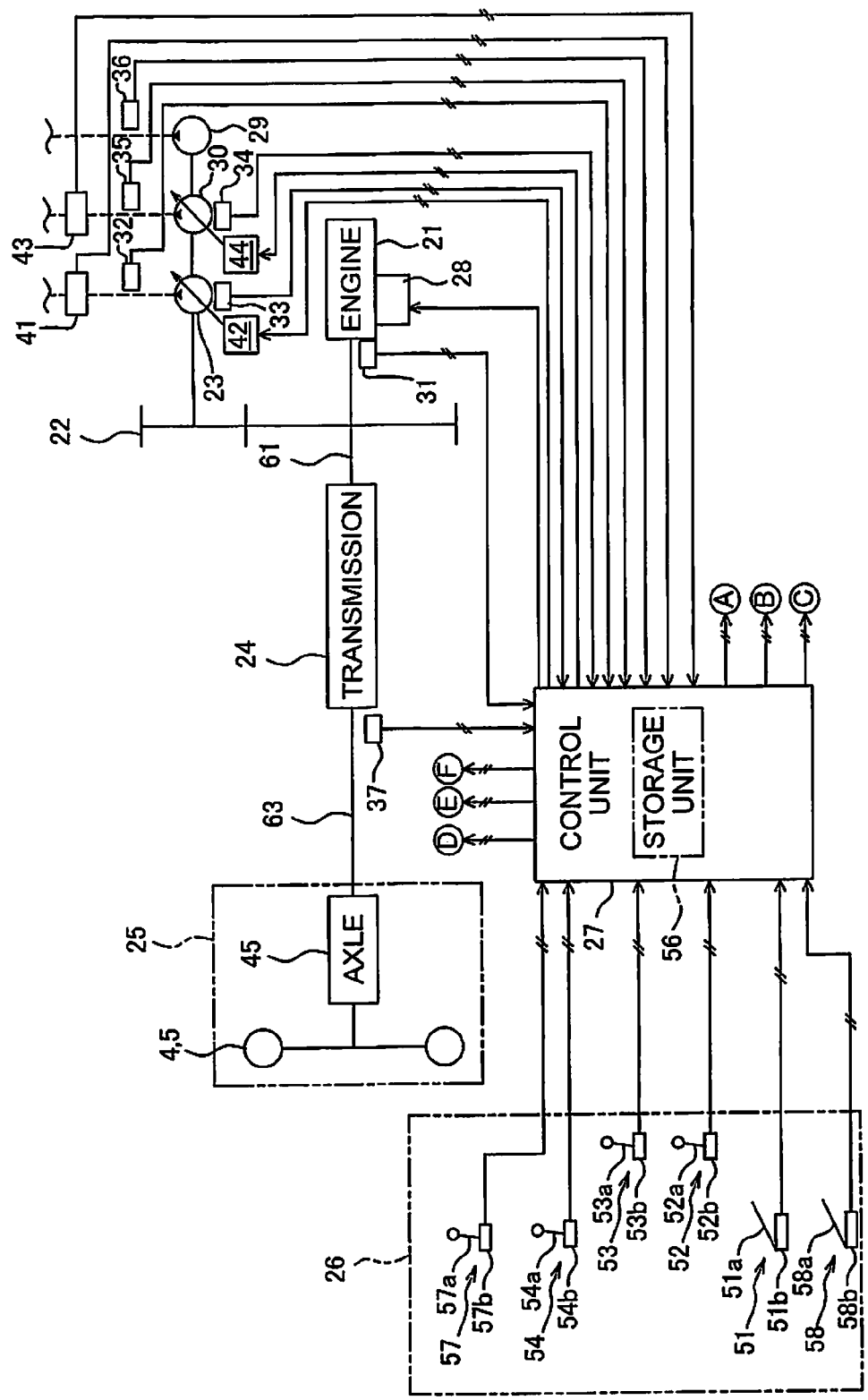
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off device 22 (referred to below as a "PTO 22"), a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 includes the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the power transmission device 24 and the hydraulic pumps 23, 30, and 29.

The work implement pump 23 is driven by driving power from the engine 21. Hydraulic fluid discharged from the work implement pump 23 is supplied to the lift cylinder 13 and the bucket cylinder 14 through a work implement control valve 41. The work implement control valve 41 changes the flow rate of the hydraulic fluid supplied to the lift cylinder 13 and to the bucket cylinder 14 in response to an operation of a below-mentioned work implement operating member 52a. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge displacement of the work implement pump 23 is changed by changing the tilt angle of a skew plate or an inclined shaft of the work implement pump 23. The discharge displacement signifies the amount of hydraulic fluid discharged for each single rotation of the work implement pump 23. A first displacement control device 42 is connected to the work implement pump 23. The first displacement control device 42 is controlled by the control unit 27 and changes the tilt angle of the work implement pump 23. As a result, the discharge displacement of the work implement pump 23 is controlled by the control unit 27. The work vehicle 1 is equipped with a first tilt angle detecting portion 33. The first tilt angle detecting portion 33 detects the tilt angle of the work implement pump 23 and transmits a detection signal indicating the tilt angle to the control unit 27.

The first displacement control device 42 includes a load sensing valve (referred to below as "LS valve"). The LS valve controls the discharge displacement of the work implement pump 23 so that a differential pressure between a discharge pressure of the work implement pump 23 and an outlet hydraulic pressure of the work implement control valve 41 satisfies a predetermined value. Specifically, the largest outlet hydraulic pressure among the outlet hydraulic pressure to the lift cylinder 13 and the outlet hydraulic pressure to the bucket cylinder 14 is inputted to the LS valve. The LS valve controls the discharge displacement of the work implement pump 23 so that a differential pressure between the discharge pressure of the work implement pump 23 and the largest outlet hydraulic pressure satisfies a predetermined value.

The steering pump 30 is driven by driving power from the engine 21. Hydraulic fluid discharged from the steering pump 30 is supplied to the above-mentioned steering cylinder 18 through a steering control valve 43. The work vehicle 1 is equipped with a steering pump pressure detecting unit 35. The steering pump pressure detecting unit 35 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge displacement of the steering pump 30 is changed by changing the tilt angle of a skew plate or an inclined shaft of the steering pump 30. A second displacement control device 44 is connected to the steering pump 30. The second displacement control device 44 is controlled by the control unit 27 and changes the tilt angle of the steering pump 30. As a result, the discharge displacement of the steering pump 30 is controlled by the control unit 27. The work vehicle 1 is equipped with a second tilt angle detecting portion 34. The second tilt angle detecting portion 34 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below-mentioned clutch control valves VF, VR, VL, and VH. The work vehicle 1 is equipped with a transmission pump pressure detecting unit 36. The transmission pump pressure detecting unit 36 detects the discharge pressure (referred to below as "transmission pump pressure") of the hydraulic fluid from the transmission pump 29 and transmits a detection signal indicating the transmission pump pressure to the control unit 27.

The PTO 22 transmits a part of the driving power from the engine 21 to the power transmission device 24. The power transmission device 24 transmits the driving power from the engine 21 to the travel device 25. The power transmission device 24 changes the speed and outputs the driving power from the engine 21. An explanation of the configuration of the power transmission device 24 is provided in detail below.

The travel device 25 is driven by the engine 21. The travel device 25 includes an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by an operator. The operating device 26 includes an accelerator operating device 51, a work implement operating device 52, a speed change operating device 53, a forward/backward travel switch operation device 54, a steering operating device 57, and a brake operating device 58.

The accelerator operating device 51 includes an accelerator operating member 51*a* and an accelerator operation detecting unit 51*b*. The accelerator operating member 51*a* is operated in order to set a target rotation speed of the engine 21. The accelerator operation detecting unit 51*b* detects an operating amount (referred to below as "accelerator operating amount") of the accelerator operating member 51*a*. The accelerator operation detecting unit 51*b* transmits a detection signal indicating the accelerator operating amount to the control unit 27.

The work implement operating device 52 includes a work implement operating member 52*a* and a work implement operation detecting unit 52*b*. The work implement operating member 52*a* is operated in order to actuate the work implement 3. The work implement operation detecting unit 52*b* detects a position of the work implement operating member 52*a*. The work implement operation detecting unit 52*b* outputs a detection signal indicating the position of the work implement operating member 52*a* to the control unit 27. The work implement operation detecting unit 52*b* detects an operating amount of the work implement operating member 52*a* by detecting the position of the work implement operating member 52*a*.

The speed change operating device 53 includes a speed change operating member 53*a* and a speed change operation detecting unit 53*b*. The operator is able to select a speed range of the power transmission device 24 by operating the speed change operating member 53*a*. The speed change operation detecting unit 53*b* detects a position of the speed change operating member 53*a*. The position of the speed change operating member 53*a* corresponds to a plurality of speed ranges such as a first speed and a second speed and the like. The speed range is referred to as speed change levels. The speed change operation detecting unit 53*b* outputs a detection signal indicating the position of the speed change operating member 53*a* to the control unit 27.

The forward/backward travel switch operation device 54 includes a forward/backward switch operating member 54*a* and a forward/backward switch operation detecting unit 54*b*. The operator can switch between forward and backward travel of the work vehicle 1 by operating the forward/backward switch operating member 54*a*. The forward/backward travel switch operation device 54 receives an instruction for forward or backward travel from the operator. The forward/backward switch operating member 54*a* is selectively switched between a forward travel position (F), a neutral position (N), and a backward travel position (R). The forward/backward switch operation detecting unit 54*b* detects a position of the forward/backward switch operating member 54*a*. The forward/backward switch operation detecting unit 54*b* outputs a detection signal (referred to below as "forward/backward operation signal Afr") indicating the position of the forward/backward switch operating member 54*a* to the control unit 27.

The steering operating device 57 includes a steering operating member 57*a*. The steering operating device 57 drives a steering control valve 43 by supplying pilot hydraulic pressure based on an operation of the steering operating member 57*a* to the steering control valve 43. The steering operating device 57 may drive the steering control valve 43 by converting an operation of the steering operating member 57*a* to an electrical signal. The operator is able to change the travel direction of the work vehicle 1 to the right or left by operating the steering operating member 57*a*.

The brake operating device 58 includes a brake operating member 58*a* and a brake operation detecting unit 58*b*. The operator is able to operate a braking force of the work vehicle 1 by operating the brake operating member 58*a*. The brake operation detecting unit 58*b* detects an operating amount of the brake operating member 58*a* (referred to below as "brake operating amount"). The brake operation detecting unit 58*b* outputs a detection signal indicating the brake operating amount to the control unit 27. The pressure of the brake oil may be used as the brake operating amount.

The control unit 27 includes a calculation device, such as a CPU, and a memory, such as a RAM or a ROM, and conducts various types of processing for controlling the work vehicle 1. Moreover, the control unit 27 includes a storage unit 56. The storage unit 56 stores various types of programs and data for controlling the work vehicle 1.

The control unit 27 transmits a command signal indicating a command throttle value to the fuel injection device 28 so that a target rotation speed of the engine 21 is obtained in accordance with the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52*b*. As a result, the hydraulic cylinders 13 and 14 expand or contract to operate the work implement 3.

The control unit 27 controls the hydraulic pressure supplied to the steering cylinder 18 by controlling the steering control valve 43 on the basis of the detection signals from the steering operation detecting unit 57*b*. As a result, the steering cylinder 18 is extended and contracted and the traveling direction of the work vehicle 1 is changed.

The control unit 27 controls the power transmission device 24 on the basis of the detection signals from each of the detecting units. The control of the power transmission device 24 by the control unit 27 is described in detail below.

Figure 3:
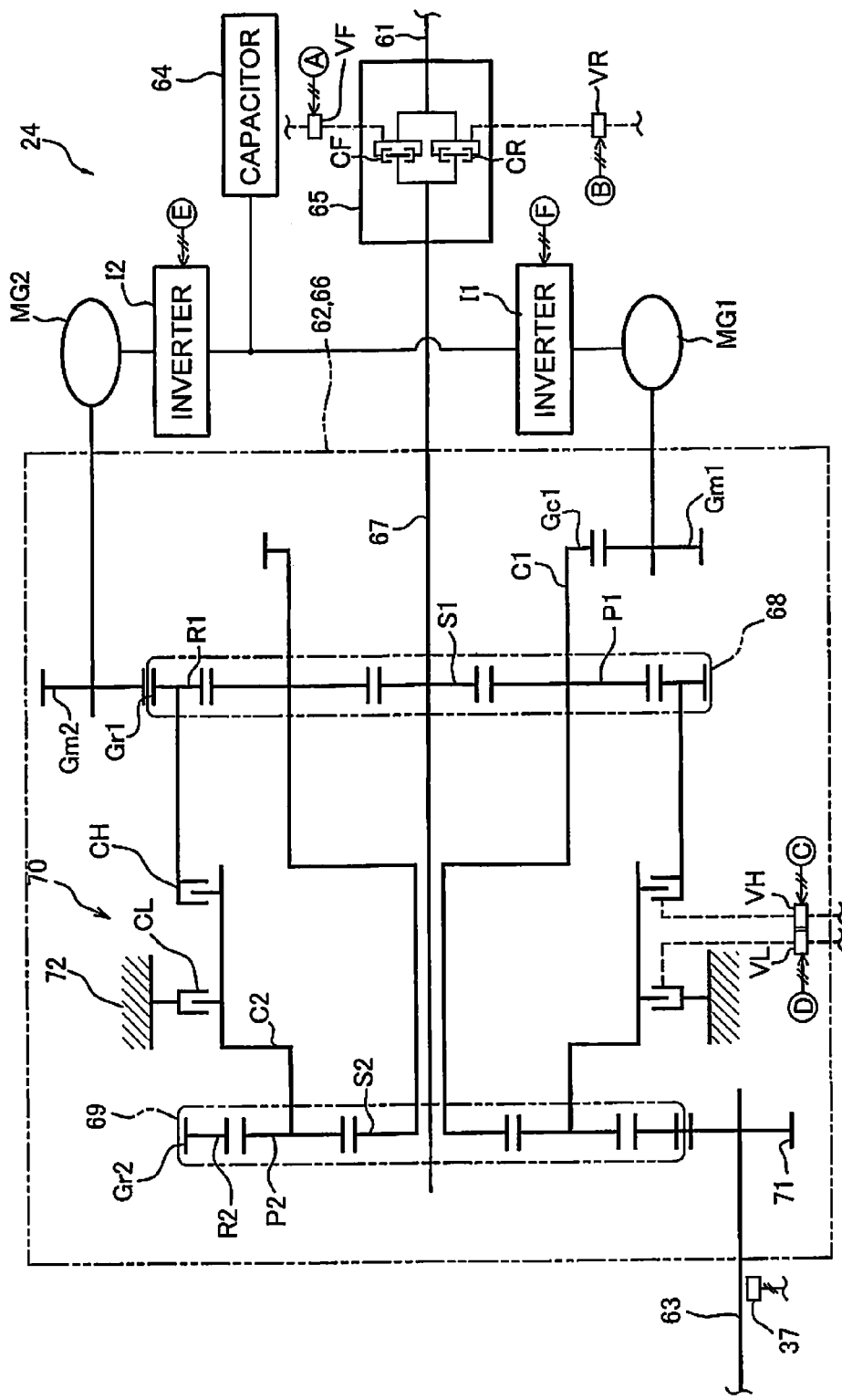
FIG. 3 is a schematic view of a configuration of a power transmission device.

Next, a detailed explanation of the configuration of the power transmission device 24 is provided. FIG. 3 is a schematic view of a configuration of the power transmission device 24. As illustrated in FIG. 3, the power transmission device 24 is provided with the input shaft 61, a FR switch mechanism 65, a gear mechanism 62, the output shaft 63, a first motor MG1, a second motor MG2, and a capacitor 64. The input shaft 61 is connected to the above-mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travel device 25, and transmits the rotation from the gear mechanism 62 to the above-mentioned travel device 25.

The FR switch mechanism 65 includes a forward travel clutch CF (referred to below as "F-clutch CF"), a backward travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by an F-clutch control valve VF. The hydraulic fluid for the R-clutch CR is controlled by an R-clutch control valve VR. The clutch control valves CF and CR are controlled by command signals from the control unit 27.

The direction of the rotation outputted from the FR switch mechanism 65 is switched due to the switching between connected/disconnected states of the F-clutch CF and disconnected/connected states of the R-clutch CR. Specifically, the F-clutch CF is connected and the R-clutch CR is disconnected when the vehicle is traveling forward. The F-clutch CF is disconnected and the R-clutch CR in connected when the vehicle is traveling backward.

The gear mechanism 62 is a mechanism for transmitting driving power from the engine 21. The gear mechanism 62 is configured so that a rotation speed ratio of the output shaft 63 with respect to the input shaft 61 is changed in response to changes in the rotation speeds of the motors MG1 and MG2. The gear mechanism 62 includes a speed change mechanism 66.

The speed change mechanism 66 includes a transmission shaft 67, a first planetary gear mechanism 68, a second planetary gear mechanism 69, a Hi/Lo switch mechanism 70, and an output gear 71. The transmission shaft 67 is coupled to the FR switch mechanism 65.

The first planetary gear mechanism 68 includes a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral portion of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 includes a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power transmission path of the power transmission device 24 between a high-speed mode (Hi mode) in which the vehicle speed is high and a low-speed mode (Lo mode) in which the vehicle speed is low. The Hi/Lo switch mechanism 70 includes an H-clutch CH that is connected during the Hi mode and an L-clutch CL that is connected during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that output driving power to the travel device 25 using electrical energy. The first motor MG1 and the second motor MG2 also function as generators that receive driving power from the engine 21 to generate electrical energy. A first motor gear Gm1 is fixed to the output shaft of the first motor MG1 and the first motor gear Gm1 meshes with the first carrier gear Gc1. Specifically, the first motor MG1 is connected to the rotating elements of the gear mechanism 62. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. Specifically, the second motor MG2 is connected to the rotating elements of the gear mechanism 62. A second inverter I2 is connected to the second motor MG2 and a command signal for controlling the motor torque of the second motor MG2 is applied to the second inverter I2 from the control unit 27.

The capacitor 64 functions as an energy storage unit for storing electricity generated by the motors MG1 and MG2. That is, the capacitor 64 stores electrical power generated by the motors MG1 and MG2 when the total of the electrical power generation amount of the motors MG1 and MG2 is high. The capacitor 64 also discharges electrical power when the total of the electrical power consumption amount of the motors MG1 and MG2 is high. That is, the motors MG1 and MG2 are driven by electrical power stored in the capacitor 64. A battery may be used in place of a capacitor as the energy storage unit.

The control unit 27 receives detection signals from the various detecting units and applies command signals for indicating the command torques for the motors MG1 and MG2 to the inverters I1 and I2. The control unit 27 may output rotation speed commands to the motors MG1 and MG2. In this case, the inverters I1 and I2 control the motors MG1 and MG2 by calculating command torques corresponding to the rotation speed commands. The control unit 27 also applies command signals for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operations of the power transmission device 24.

Figure 4:
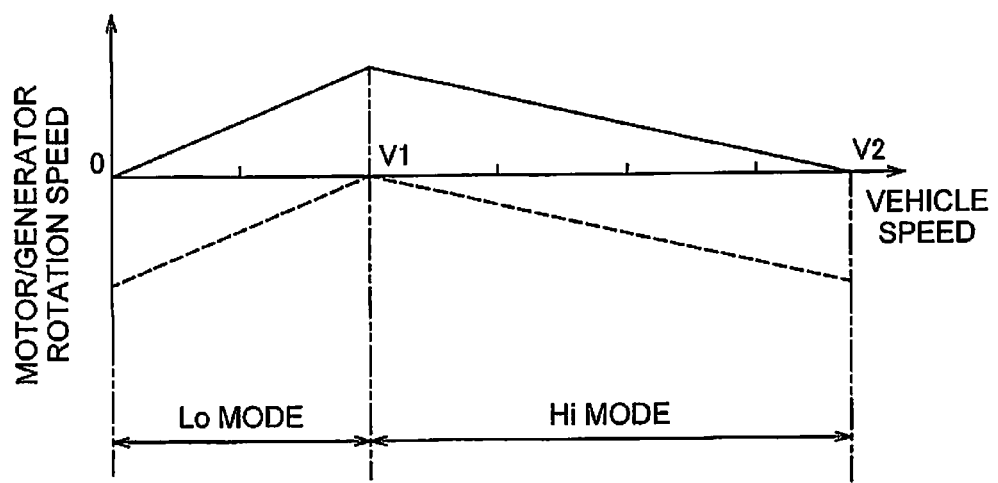
FIG. 4 illustrates changes in the rotation speeds of a first motor and a second motor with respect to the vehicle speed.

An outline of operations of the power transmission device 24 when the vehicle speed increases from zero in the forward movement side while the rotation speed of the engine 21 remains constant, will be explained with reference to FIG. 4. FIG. 4 illustrates the rotation speeds of the motors MG1 and MG2 with respect to the vehicle speed. When the rotation speed of the engine 21 is constant, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

The L-clutch CL is connected and the H-clutch CH is disconnected in a region when the vehicle speed increases from zero to V1 (Lo mode). Because the H-clutch CH is OFF in the Lo mode, the second carrier C2 and the first ring gear R1 are disconnected. Because the L-clutch CL is ON, the second carrier C2 is fixed.

The driving power from the engine 21 in the Lo mode is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the Lo mode, and a portion of the electrical power generated by the second motor MG2 is stored in the capacitor 64. Moreover, a portion of the electrical power generated by the second motor MG2 is consumed in the driving of the first motor MG1.

The first motor MG1 functions mainly as an electric motor in the Lo mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

The H-clutch CH is connected and the L-clutch CL is disconnected in the region in which the vehicle speed exceeds V1 (Hi mode). Because the H-clutch CH is connected in the Hi mode, the second carrier C2 and the first ring gear R1 are connected. Because the L-clutch CL is disconnected, the second carrier C2 is disconnected. Therefore, the rotation speeds of the first ring gear R1 and the second carrier C2 match.

The driving power from the engine 21 in the Hi mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the Hi mode, and thus a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward travel driving has been discussed above, the operations of backward travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device by controlling the motor torque of the first motor MG1 and the second motor MG2. The control unit 27 controls the tractive force or the braking force of the work vehicle 1 by controlling the motor torques of the first motor MG1 and the second motor MG2.

A method for determining the command values (referred to below as "command torques") of the motor torques to the first motor MG1 and the second motor MG2 is explained below.

Figure 5:
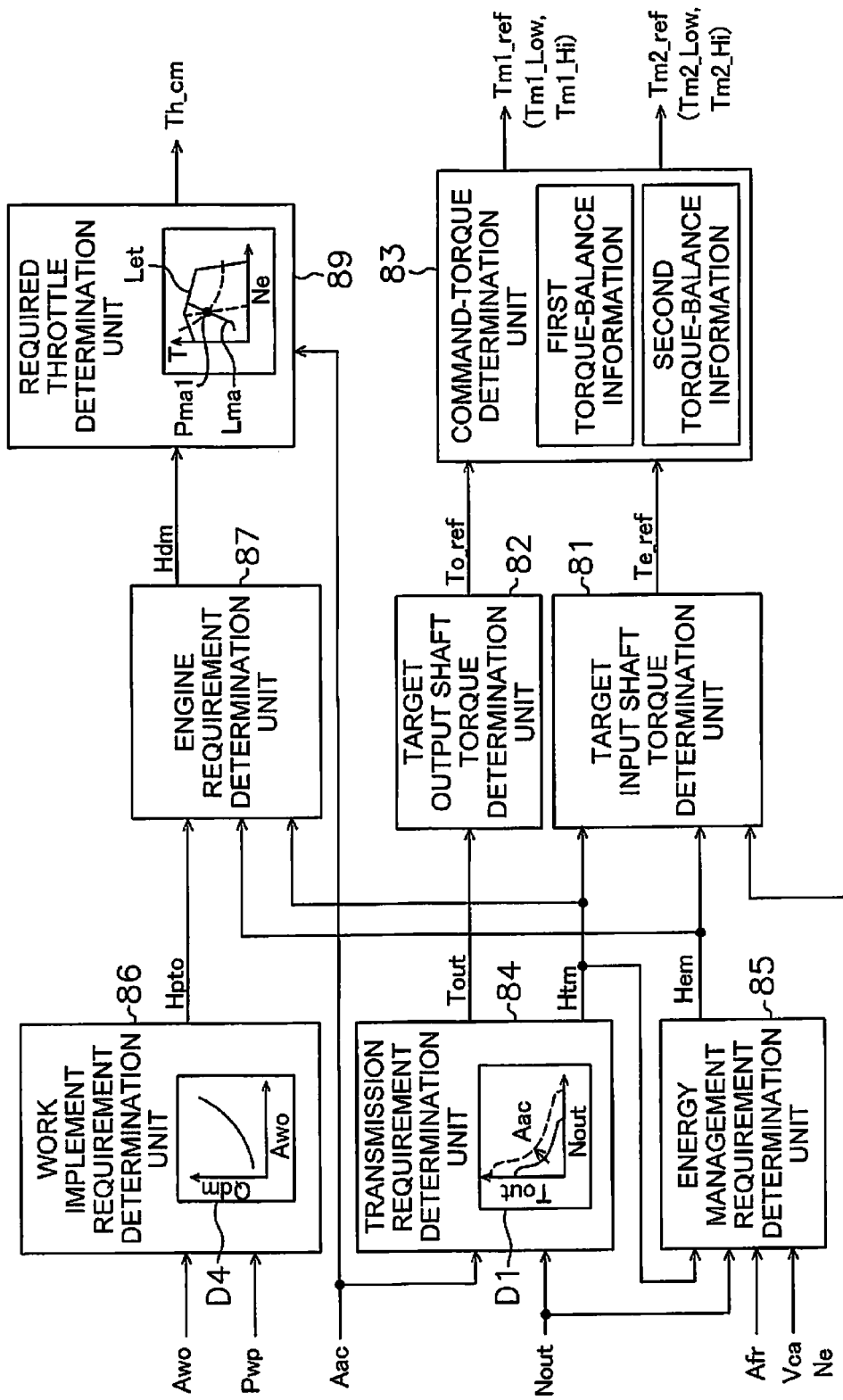
FIG. 5 is a block diagram illustrating a process for determining command torques for the motors.

FIG. 5 is a control block diagram illustrating processing executed by the control unit 27. The control unit 27 includes a transmission requirement determination unit 84, an energy management requirement determination unit 85, and a work implement requirement determination unit 86 as illustrated in FIG. 5.

The transmission requirement determination unit 84 determines a required tractive force Tout on the basis of an accelerator operating amount Aac and an output rotation speed Nout. Specifically, the transmission requirement determination unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout. The required tractive force characteristics are changed in response to the accelerator operating amount Aac. The required tractive force characteristics correspond to predetermined vehicle speed—tractive force characteristics. The transmission requirement determination unit 84 uses the required tractive force characteristics corresponding to the accelerator operating amount Aac to determine the required tractive force Tout from the output rotation speed Nout and to determine a transmission required power Htm that is a product of the output rotation speed Nout and the required tractive force Tout.

Figure 6:
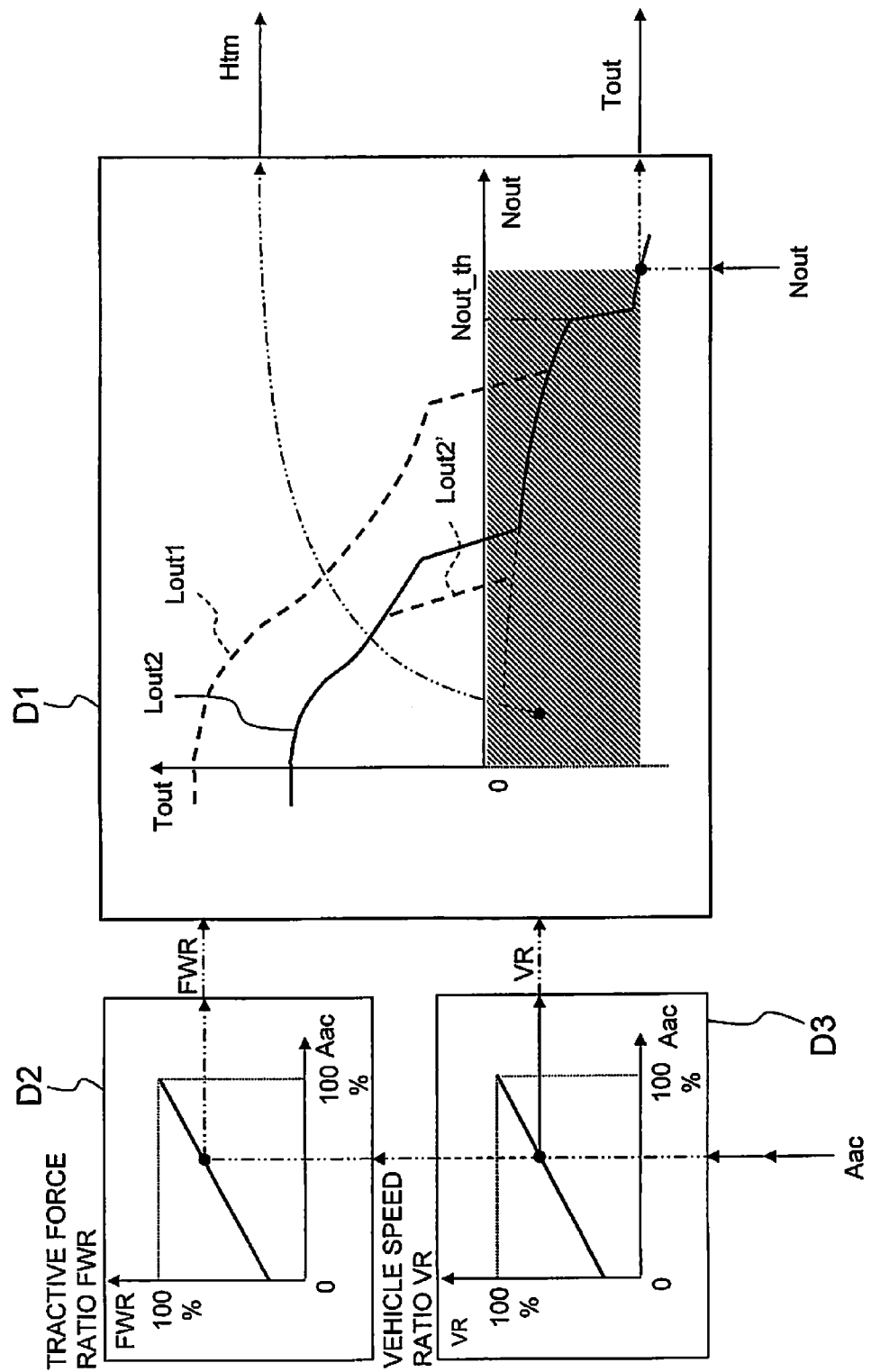
FIG. 6 is a graph depicting an example of required tractive force characteristics.

Specifically, as illustrated in FIG. 6, the storage unit 56 stores data Lout1 (referred to below as "basic tractive force characteristics Lout1") indicating basic required tractive force characteristics. The basic tractive force characteristics Lout1 are required tractive force characteristics when the accelerator operating amount Aac is at the maximum value, that is, at 100%. The basic tractive force characteristics Lout1 are determined in response to a speed change level selected by the speed change operating member 53a. The transmission requirement determination unit 84 determines current required tractive force characteristics Lout2 by multiplying a tractive force ratio FWR and a vehicle speed ratio VR by the basic tractive force characteristics Lout1.

The storage unit 56 stores tractive force ratio information D2 and vehicle speed ratio information D3. The tractive force ratio information D2 defines the tractive force ratio FWR with respect to the accelerator operating amount Aac. The vehicle speed ratio information D3 defines the vehicle speed ratio VR with respect to the accelerator operating amount Aac. The transmission requirement determination unit 84 determines the tractive force ratio FWR and the vehicle speed ratio VR in response to the accelerator operating amount Aac. The transmission requirement determination unit 84 determines the current required tractive force characteristics Lout2 in response to the accelerator operating amount Aac by multiplying the tractive force ratio FWR in the vertical axis direction which indicates the required tractive force and the vehicle speed ratio VR in the horizontal axis direction which indicates the output rotation speed Nout, by the basic tractive force characteristics Lout1.

The tractive force ratio information D2 defines the tractive force ratio FWR which increases in correspondence to an increase in the accelerator operating amount Aac. The vehicle speed ratio information D3 defines the vehicle speed ratio VR which increases in correspondence to an increase in the accelerator operating amount Aac. However, the tractive force ratio FWR is greater than zero when the accelerator operating amount Aac is zero. Similarly, the vehicle speed ratio VR is greater than zero when the accelerator operating amount Aac is zero. As a result, the required tractive force Tout is a value greater than zero even when the accelerator operating member 51a is not being operated. That is, tractive force is being outputted from the power transmission device 24 even when the accelerator operating member 51a is not being operated. As a result, a behavior similar to creep generated in a torque converter-type speed change device is materialized in the EMT-type power transmission device 24.

The required tractive force characteristics information D1 defines the required tractive force Tout which increases in response to a reduction in the output rotation speed Nout. When the above-mentioned speed change operating member 53a is operated, the transmission requirement determination unit 84 changes the required tractive force characteristics in response to the speed change level selected by the speed change operating member 53a. For example, when a downshift is conducted using the speed change operating member 53a, the required tractive force characteristics information changes from Lout2 to Lout2' as illustrated in FIG. 6. As a result, the upper limit of the output rotation speed Nout is reduced. That is, the upper limit of the vehicle speed is reduced.

The required tractive force characteristics information D1 defines the required tractive force Tout as a negative value with respect to the output rotation speed Nout that is no less than the predetermined vehicle speed. As a result, the required tractive force Tout is determined to be a negative value when the output rotation speed Nout is larger than the upper limit of the output rotation speed in the selected speed range. A braking force is generated when the required tractive force Tout is a negative value. As a result, a behavior similar to engine brake generated in a torque converter-type speed change device is materialized in the EMT-type power transmission device 24.

The energy management requirement determination unit 85 illustrated in FIG. 5 determines an energy management required power Hem on the basis of the difference between the target electricity storage amount and the current electricity storage amount in the capacitor 64. The energy management required power Hem is a power required by the power transmission device 24 for charging the capacitor 64. The energy management requirement determination unit 85 is described in detail below.

The work implement requirement determination unit 86 determines a work implement required power Hpto on the basis of a work implement pump pressure Pwp and an operating amount Awo (referred to below as "work implement operating amount Awo") of the work implement operating member 52a. In the present embodiment, the work implement required power Hpto is a power distributed to the work implement pump 23. However, the work implement required power Hpto may include a power distributed to the steering pump 30 and/or the transmission pump 29.

Specifically, the work implement requirement determination unit 86 determines a required flow rate Qdm of the work implement pump 23 from the work implement operating amount Awo on the basis of required flow rate information D4. The required flow rate information D4 is stored in the storage unit 56 and defines the relationship between the required flow rate Qdm and the work implement operating amount Awo. The required flow rate information D4 defines the relationship between the required flow rate Qdm and the work implement operating amount Awo so that the required flow rate Qdm increases in correspondence with an increase in the work implement operating amount Awo. The work implement requirement determination unit 86 determines the work implement required power Hpto from the required flow rate Qdm and the work implement pump pressure Pwp.

The control unit 27 includes a target output shaft torque determination unit 82, a target input shaft torque determination unit 81, and a command-torque determination unit 83.

The target output shaft torque determination unit 82 determines a target output shaft torque To_Ref. The target output shaft torque To_Ref is a target value of the torque to be outputted from the power-transmission device 24. The target output shaft torque determination unit 82 determines the target output shaft torque To_ref on the basis of the required tractive force Tout determined by the transmission requirement determination unit 84. That is, the target output torque To_Ref is determined so that the tractive force outputted from the power transmission device 24 obeys the required tractive force characteristics defined by the required tractive force characteristics information D1. Specifically, the target output shaft torque To_ref is determined by multiplying the required tractive force Tout by a predetermined distribution ratio. The predetermined distribution ratio is set, for example, so that the total of the work implement required power Hpto, the transmission required power Htm, and the energy management required power Hem does not exceed the output power from the engine 21.

The target input shaft torque determination unit 81 determines a target input shaft torque Te_Ref. The target input shaft torque Te_Ref is a target value for the torque to be inputted to the power-transmission device 24. The target-input-torque determination unit 81 determines the target input torque Te_ref on the basis of the transmission required power Htm and the energy management required power Hem. Specifically, the target input shaft torque determination unit 81 calculates the target input shaft torque Te_Ref by multiplying the engine rotation speed by the sum of the energy management required power Hem and the value of the transmission required power Htm multiplied by the predetermined distribution ratio. The transmission required power Htm is calculated by multiplying the above-mentioned required tractive force Tout by the current output rotation speed Nout.

The command-torque determination unit 83 uses torque-balance information to determine command torques Tm1_Ref and Tm2_Ref to the motors MG1 and MG2 from the target input torque Te_Ref and the target output torque To_Ref. The torque-balance information defines a relationship between the target input torque Te_Ref and the target output torque To_Ref so as to achieve a balance among the torques of the power transmission device 24. The torque-balance information is stored in the storage unit 56.

As described above, the transmission paths of the driving power in the power transmission device 24 are different for the Lo mode and the Hi mode. As a result, the command-torque determination unit 83 uses different torque-balance information to determine the command torques Tm1_ref and Tm2_ref for the motors MG1 and MG2 in the Lo mode and the Hi mode. Specifically, the command-torque determination unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$$Ts1\_Low = Te\_ref * r\_fr$$

$$Tc1\_Low = Ts1\_Low * (-1) * ((Zr1/Zs1)+1)$$

$$Tr2\_Low = To\_ref * (Zod/Zo)$$

$$Ts2\_Low = Tr2\_Low * (Zs2/Zr2)$$

$$Tcp1\_Low = Tc1\_Low + Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \quad \text{Equation 1}$$

The command-torque determination unit 83 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1)+1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2)+1)$$

$$Tcp2\_Hi = Tr1\_Hi + Tc2\_Hi$$

$$Tm2\_Hi = Tcp2\_Hi * (-1) * (Zp2/Zp2d) \quad \text{Equation 2}$$

The contents of the parameters in each torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 outputs the engine rotation speed to decelerate to 1/r_fr. When the FR switch mechanism 65 is in the forward travel state, r_fr is a negative value. When the FR switch mechanism 65 is in the backward travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

Next, the control of the engine 21 by the control unit 27 is described in detail below. As described above, the control unit 27 controls the engine by transmitting command signals to the fuel injection device 28. A method for determining the command throttle values for the fuel injection device 28 will be explained below. The control unit 27 includes an engine requirement determination unit 87 and a required throttle determination unit 89.

The engine requirement determination unit 87 determines an engine required power Hdm on the basis of the work implement required power Hpto, the transmission required power Htm, and the energy management required power Hem. The engine requirement determination unit 87 determines the engine required power Hdm by adding together the work implement required power Hpto, the transmission required power Htm, and the energy management required power Hem.

The required throttle determination unit 89 determines a command throttle value Th_cm from the engine required power Hdm and the accelerator operating amount Aac. The required throttle determination unit 89 uses an engine torque line Let and a matching line Lma stored in the storage unit 56 to determine the command throttle value Th_cm. The engine torque line Let defines a relationship between the output torque of the engine 21 and the engine rotation speed Ne. The matching line Lma is information for determining a first required throttle value from the engine required power Hdm.

The required throttle determination unit 89 determines a first required throttle value Th_tm1 so that the engine torque line Let and the matching line Lma match at a matching point Pma1 where the output torque of the engine 21 becomes the torque corresponding to the engine required power Hdm. The required throttle determination unit 89 determines the lowest required throttle value Th_cm from the first required throttle value and a second required throttle value corresponding to the accelerator operating amount Aac.

Figure 7:
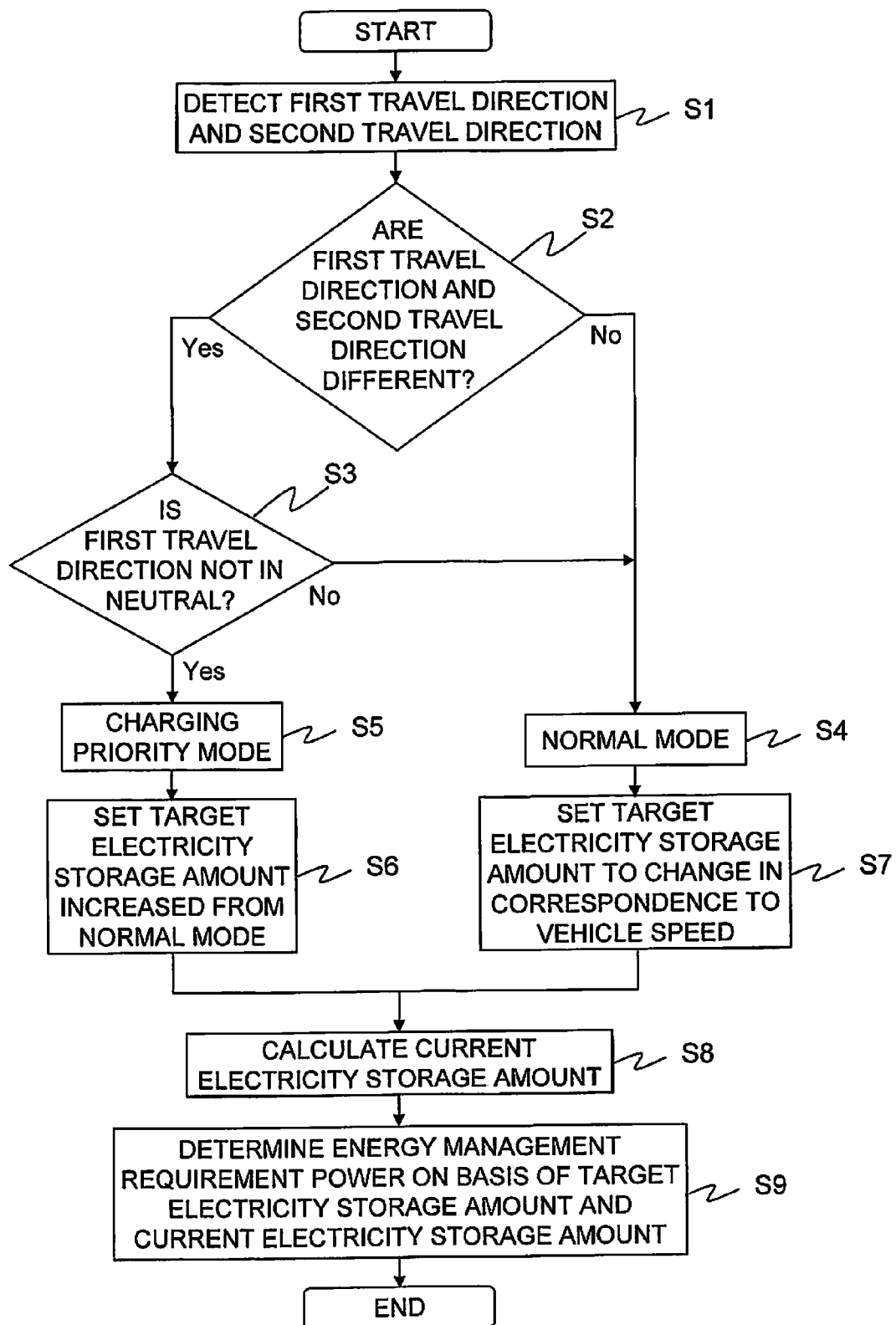
FIG. 7 is a flow chart depicting an operation flow of an energy management requirement determination unit.

Next, the energy management requirement determination unit 85 is described in detail. FIG. 7 is a flow chart depicting an operation flow of the energy management requirement determination unit 85. The energy management requirement determination unit 85 determines the energy management required power Hem on the basis of the output rotation speed Nout, the forward/backward operation signal Afr and a voltage Vca in the capacitor 64. First, the energy management requirement determination unit 85 detects the first travel direction and the second travel direction (step S1). The first travel direction is the travel direction indicated by the forward/backward operation signal Afr which is an instruction from the operator inputted through the forward/backward travel switch operation device 54. The first travel direction is any one of the forward direction (F), neutral (N), or the backward direction (R). The second travel direction is a travel direction of the work vehicle 1 detected by the vehicle speed detecting unit 37. The second travel direction is either forward travel or backward travel. Next, the energy management requirement determination unit 85 determines whether the first travel direction and the second travel direction are the same direction or opposite directions (step S2). The energy management requirement determination unit 85 determines a mode on the basis of the determination result. When the first travel direction and the second travel direction are the same direction (step S2: No), or when the first travel direction and the second travel direction are different directions (step S2: Yes) and the first travel direction is neutral (step S3: No), the energy management requirement determination unit 85 determines that the mode is a normal mode (step S4). When the first travel direction and the second travel direction are different (step S2: Yes) and the first travel direction is not neutral (that is, the work vehicle 1 is performing a shuttle action) (step S3: Yes), the energy management requirement determination unit 85 determines that the mode is a charging priority mode (step S5).

Figure 8:
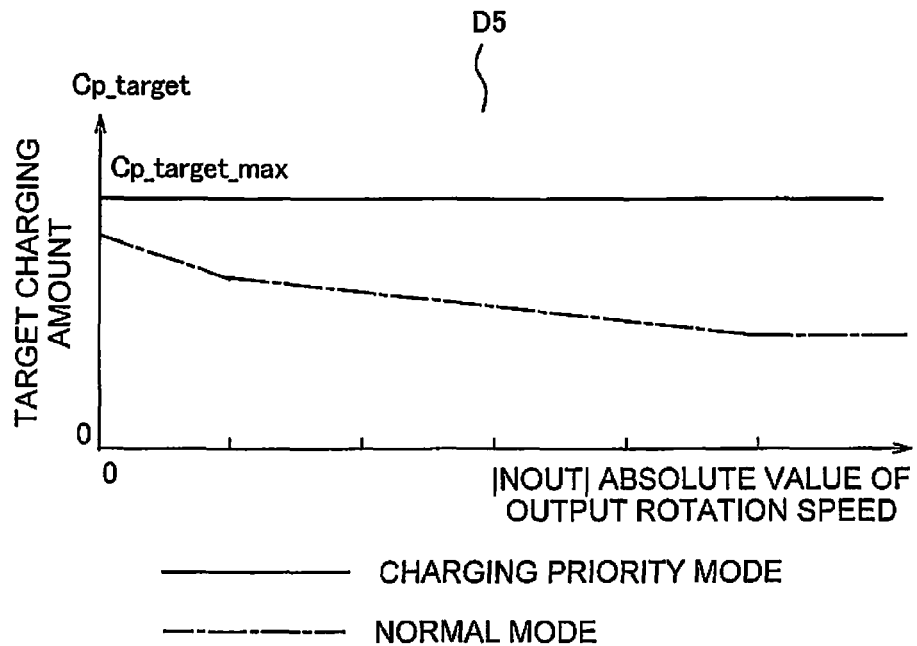
FIG. 8 is a diagram for depicting the relationship between an output rotation speed Nout and a target electricity storage amount Cp_target.

Next, the energy management requirement determination unit 85 refers to target electricity storage amount information D5 and determines a target electricity storage amount Cp_target from the output rotation speed Nout on the basis of whether the mode is the normal mode or the priority mode. That is, the energy management requirement determination unit 85 determines the target electricity storage amount Cp_target on the basis of the vehicle speed. The target electricity storage amount information D5 is stored in the storage unit 56. The target electricity storage amount information D5 defines the relationship between the output rotation speed Nout and the target electricity storage amount Cp_target. FIG. 8 is a diagram for depicting the relationship between an absolute value |Nout| of the output rotation speed and the target electricity storage amount Cp_target in the normal mode and the charging priority mode. According to FIG. 8, the target electricity storage amount Cp_target in the charging priority mode is greater than the target electricity storage amount Cp_target in the normal mode if the output rotation speed Nout is the same. That is, when the first travel direction and the second travel direction are different (step S2: Yes) and the first travel direction is not neutral (step S3: Yes), that is, during the charging priority mode (step S5), the energy management requirement determination unit 85 increases the target electricity storage amount Cp_target (step S6). Moreover, the target electricity storage amount Cp_target decreases in correspondence to an increase in the absolute value |Nout| of the output rotation speed in the normal mode (step S4). That is, the energy management requirement determination unit 85 changes the target electricity storage amount Cp_target in response to the vehicle speed when the first travel direction and the second travel direction match. Further, the energy management requirement determination unit 85 reduces the target electricity storage amount Cp_target in correspondence to a rise in the absolute value of the vehicle speed when the first travel direction and the second travel direction match (step S7). The target electricity storage amount Cp_target in the charging priority mode (step S5) is constant at a predetermined value Cp_target_max regardless of the output rotation speed Nout (step S6). The predetermined value is a value derived by subtracting a predetermined margin from the maximum electricity storage amount of the capacitor 64. The margin is set in order to prevent overcharging due to the electricity storage amount overshooting and exceeding the maximum electricity storage amount of the capacitor 64.

Figure 9:
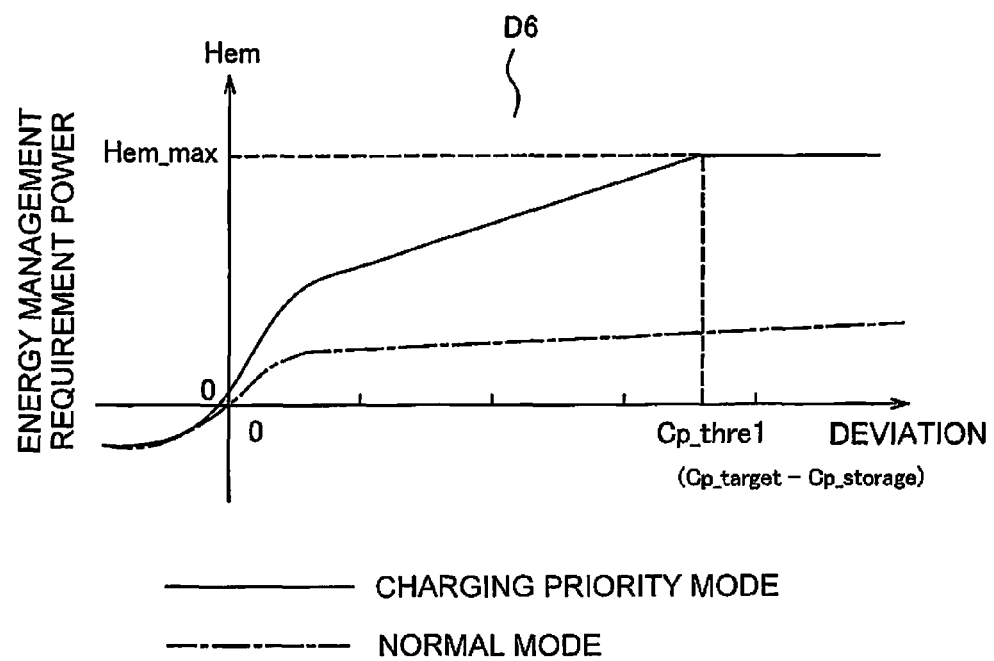
FIG. 9 is a view for depicting the relationship between a deviation and an energy management required power Hem.

Further, the energy management requirement determination unit 85 is able to calculate a current electricity storage amount Cp_storage from the voltage Vca of the capacitor 64 and the capacitance of the capacitor 64 (step S8). Finally, the energy management requirement determination unit 85 determines the energy management required power Hem on the basis of the difference (this difference is referred to as "deviation" below) between the target electricity storage amount Cp_target and the current electricity storage amount Cp_storage (step S9). The energy management requirement determination unit 85 refers to relationship information D6 which indicates the relationship between the deviation and the energy management required power Hem when determining the energy management required power Hem. The relationship information D6 defines the relationship between the deviation (Cp_target−Cp_storage) and the energy management required power Hem. FIG. 9 is a view for depicting the relationship between the deviation and the energy management required power Hem in the normal mode and the charging priority mode. The energy management required power Hem being positive in FIG. 9 signifies that power for charging the capacitor 64 from the driving power of the engine or the braking force is assured. The energy management required power Hem being negative signifies that power for discharging the capacitor 64 by driving the motor is assured.

According to FIG. 9, the energy management required power Hem is positive in either of the charging priority mode or the normal mode when the deviation is positive. The energy management required power Hem in the charging priority mode is greater than the energy management required power Hem in the normal mode when the deviations are the same. That is, the energy management requirement determination unit 85 increases the energy management required power Hem when the first travel direction and the second travel direction are different. The energy management required power Hem is negative in either of the charging priority mode or the normal mode when the deviation is negative. Specifically, the energy management requirement determination unit 85 determines the energy management required power Hem for discharging the capacitor 64 when the current electricity storage amount Cp_storage exceeds the target electricity storage amount Cp_target.

The energy management required power Hem increases in correspondence to an increase in the deviation in the normal mode. However, the energy management required power Hem becomes constant at the maximum value Hem_max when the deviation exceeds a predetermined threshold Cp_thre1 in the charging priority mode. The energy management required power maximum value Hem_max is a value that does not exceed the maximum charging power determined by the configuration of the capacitor 64, by the allowable electric current of an electric circuit between the capacitor 64 and the motors MG1 and MG2, or by the heat balance.

The energy management required power Hem in the charging priority mode is set so as not to exceed a recovery power recovered from braking for the deceleration during the shuttle action. The recovery power recovered from braking is derived by multiplying the transmission required power Htm by −1. (The transmission required power Htm during braking is a negative value because the required tractive force Tout is a negative value.) Therefore, during braking, the energy management required power Hem in the charging priority mode is less than the energy management required power Hem in the normal mode. In this case, the engine required power Hdm is determined by the energy management required power Hem in the normal mode. Consequently, when the recovery power recovered from the shuttle action is small, the control unit 27 carries out control so that fuel is consumed and charging for the capacitor 64 is performed. Conversely, when the recovery power recovered from the shuttle action is large, the engine required power Hdm that is the sum of the work implement required power Hpto, the transmission required power Htm, and the energy management required power Hem is negative. In this case, the engine 21 does not output torque. Therefore, the engine 21 does not consume fuel.

The work vehicle 1 according to the present exemplary embodiment has the following features. The energy management requirement determination unit 85 increases the target electricity storage amount Cp_target when the first travel direction according to the instruction from the operator inputted from the forward/backward travel switch operation device 54 and the second travel direction determined from the vehicle speed (rotating direction of the output shaft 63) detected by the vehicle speed detecting unit 37 are different. After the work vehicle 1 decelerates, the speed is then increased toward the first travel direction during the shuttle action in which the first travel direction and the second travel direction are different. Therefore, the energy recovered in the capacitor 64 during the deceleration is used quickly in the subsequent acceleration. Therefore, overcharging when the electricity storage amount exceeds the upper limit is not brought about even when the electricity storage amount increases during deceleration and is charged so as to be close to the maximum electricity storage amount of the capacitor 64. Moreover, discharging that exceeds the lower limit of the electricity storage amount does not occur when discharging during the subsequent acceleration. Moreover, the energy management requirement determination unit 85 determines the energy management required power Hem in the normal mode during discharging during the subsequent acceleration. Therefore, discharging that exceeds the lower limit of the electricity storage amount does not occur when discharging during acceleration. Consequently, the energy recovery amount increases and fuel consumption performance of the work vehicle 1 can be improved.

The energy management requirement determination unit 85 increases the energy management required power Hem when the first travel direction and the second travel direction are different. Because the electricity recovered during deceleration is quickly used during the subsequent acceleration in the shuttle action, the electricity storage amount of the capacitor 64 does not exceed the upper limit even if the energy management required power Hem during deceleration increases. Moreover, the energy management requirement determination unit 85 determines the energy management required power Hem in the normal mode during discharging in the subsequent acceleration. Therefore, discharging that exceeds the lower limit of the electricity storage amount does not occur when discharging during the subsequent acceleration. Consequently, the energy recovery amount increases and fuel consumption performance of the work vehicle 1 can be improved.

The energy management requirement determination unit 85 determines the target electricity storage amount Cp_target on the basis of the vehicle speed (output rotation speed Nout). In particular, the energy management requirement determination unit 85 changes the target electricity storage amount Cp_target in response to the vehicle speed (output rotation speed Nout) when the first travel direction and the second travel direction match (that is, during the normal mode). When the vehicle speed changes, the electrical power generation amount changes due to braking that is anticipated in the future. Therefore, unnecessary driving of the engine 21 and charging of the capacitor 64 is prevented. Consequently, fuel consumption of the work vehicle 1 is improved.

The energy management requirement determination unit 85 reduces the target electricity storage amount Cp_target in correspondence to an increase in the absolute value of the vehicle speed (output rotation speed Nout) when the first travel direction and the second travel direction match (that is, during the normal mode). When the vehicle speed increases, the electrical power generation amount due to braking anticipated in the future increases. Therefore, unnecessary driving of the engine 21 and charging of the capacitor 64 is prevented. Consequently, fuel consumption of the work vehicle 1 is improved.

The energy management requirement determination unit 85 reduces the energy management required power Hem in correspondence to a decrease in the difference between the target electricity storage amount Cp_target and the current electricity storage amount Cp_storage. As a result, the electricity storage amount of the capacitor 64 is prevented from exceeding the upper limit.

The energy management requirement determination unit 85 determines the negative energy management required power Hem for discharging the capacitor 64 when the current electricity storage amount Cp_storage exceeds the target electricity storage amount Cp_target. Therefore, fuel consumption of the work vehicle 1 is improved because the electricity stored in the capacitor 64 can be consumed effectively during the acceleration and the like of the work vehicle 1.

The capacitor 64 can be used as the energy storage unit. Because a capacitor has a lower internal resistance than a battery, charging and discharging of a large amount of electrical power can be carried out in a shorter time in comparison to a battery. Therefore, a large amount of energy recovery can be carried out in a short time in a work vehicle in which acceleration and deceleration are repeated in a short time as in the work vehicle 1 according to the present embodiment. Therefore, fuel consumption of the work vehicle 1 can be improved.

The present invention is not limited to the above exemplary embodiment and various changes and modifications may be made without departing from the spirit of the invention.

The present invention is not limited to the above-mentioned wheel loader and may be applied to another type of work vehicle such as a bulldozer, a tractor, a forklift, or a motor grader.

The target electricity storage amount Cp_target of the charging priority mode in FIG. 7 may be changed in response to the output rotation speed Nout instead of the constant value Cp_target_max. The target electricity storage amount Cp_target in the charging priority mode may be changed in response to another state (for example, the magnitude of the vehicle speed in the direction opposite to the travel direction indicated by the forward/backward operation signal Afr) of the work vehicle 1. In this case, the target electricity storage amount Cp_target of the charging priority mode may be set to be higher than the target electricity storage amount Cp_target of the normal mode and lower than the constant value Cp_target_max. Moreover, an allowable width of the target electricity storage amount Cp_target may be provided and the width may be held to the required values for charging and discharging so that the target charged capacity is kept within the allowable width.

Steps S4 and S5 in FIG. 7 may be omitted. Moreover, step S3 may be omitted and the charging priority mode may be determined when the response of step S2 is Yes.

The configuration of the power transmission device 24 is not limited to the configuration of the above exemplary embodiment. For example, the coupling and disposition of the elements of the two planetary gear mechanisms 68 and 69 are not limited to the coupling and disposition of the above exemplary embodiment. The number of the planetary gear mechanisms provided in the power transmission device 24 is not limited to two. The power transmission device 24 may only have one planetary gear mechanism. Alternatively, the power transmission device 24 may have three or more planetary gear mechanisms.

The torque-balance information is not limited to the equations for balancing the torque as in the above exemplary embodiment. For example, the torque-balance information may be in the format of a table or a map. The torque-balance information is not limited to the above-mentioned two types of torque-balance information of the first torque-balance information and the second torque-balance information. Three or more types of torque-balance information may be used in combination with a selectable number of modes in the power transmission device 24 when the driving power transmission path of the power transmission device 24 includes three or more modes. Alternatively, only one torque-balance information may be used when there is only one driving power transmission path for the power transmission device 24.

Figure 10:
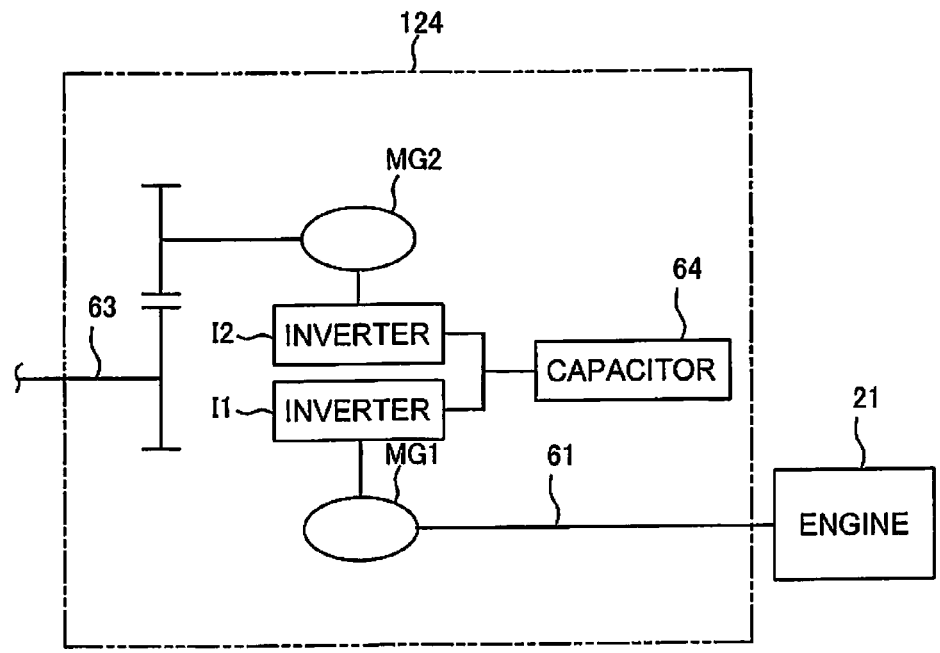
FIG. 10 is a schematic view illustrating a power transmission device according to a first modified example.

The power transmission device is not limited to a so-called split system device using the planetary gear mechanism as described above, and may use a device of another system. For example, FIG. 10 is a schematic view illustrating a power transmission device 124 according to a first modified example. The power transmission device 124 illustrated in FIG. 10 is a so-called series system power transmission device. The engine 21 in the power transmission device 124 only uses the first motor MG1 to generate electricity. The second motor MG2 uses the electrical power generated in the first motor MG1 to drive the travel device. Further, the second motor MG2 recovers energy during braking and the like to generate electricity, and the first motor MG1 uses the recovered electrical power to drive the engine 21. That is, the first motor MG1 drives the engine 21 as a motor and consumes the electrical power recovered due to engine braking.

Figure 11:
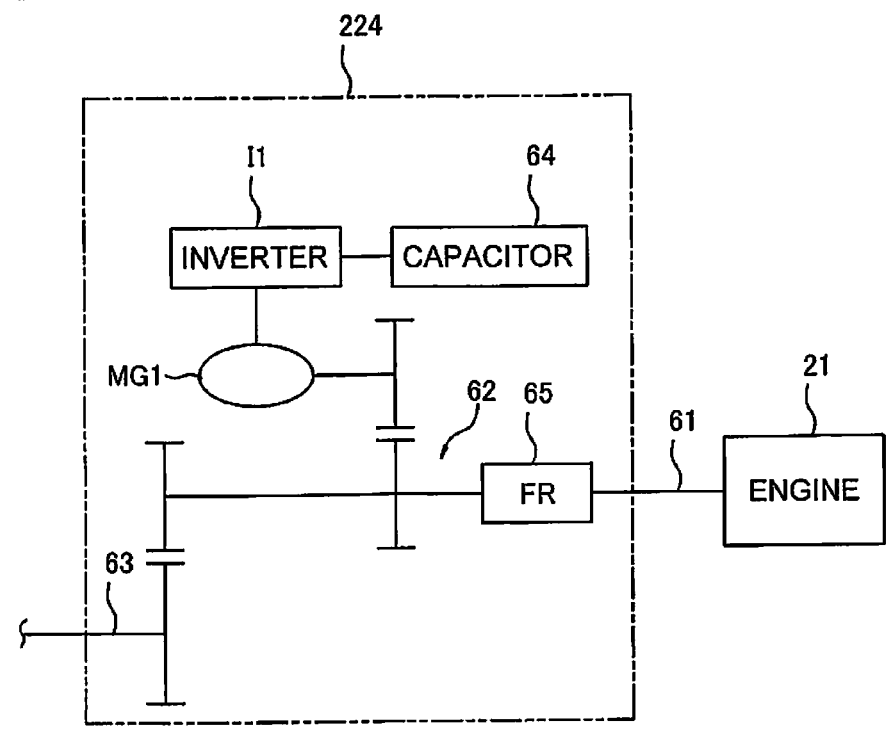
FIG. 11 is a schematic view illustrating a power transmission device according to a second modified example.

Alternatively, a parallel system power transmission device 224 as illustrated in FIG. 11 may be used. FIG. 11 is a schematic view illustrating a power transmission device 224 according to a second modified example. The driving power of the engine 21 in the power transmission device 224 is transmitted via the gear mechanism 62 to the output shaft 62. The output shaft 62 is driven by driving power from the motor MG1. The motor MG1 generates electricity by recovering energy during deceleration.

Configurations that are the same in the above exemplary embodiment are provided with the same reference numerals in FIGS. 10 and 11 and explanations thereof are omitted.

The present invention is useful as a hybrid-type work vehicle having superior fuel consumption performance and as a control method for the work vehicle.

What is claimed is:

1. A work vehicle comprising:
an engine;
a hydraulic pump driven by the engine;
a work implement driven by hydraulic fluid discharged from the hydraulic pump;
a travel device;
a power transmission device that transmits a driving power from the engine to the travel device;
a forward/backward travel switch operation device that receives an instruction for forward or backward travel from an operator;
a vehicle speed detecting unit that detects a vehicle speed of the travel device; and
a control unit configured to control the power transmission device;
the power transmission device including
an input shaft;
an output shaft;
a generator that receives the driving power from the engine;
a motor that outputs the driving power to the travel device; and
an energy storage unit that stores electricity generated by the generator;
the power transmission device being configured so that a rotation speed ratio of the output shaft with respect to the input shaft is changed by changing the rotation speed of the motor; and
the control unit including
an energy management requirement determination unit that determines, on the basis of a difference between a target electricity storage amount and a current electricity storage amount in the energy storage unit, an energy management required power required by the power transmission device for charging the energy storage unit; and
the energy management requirement determination unit increasing the target electricity storage amount when a first travel direction according to an instruction from the operator that is received from the forward/backward travel switch operation device, and a second travel direction determined from the vehicle speed detected by the vehicle speed detecting unit, are different.

2. The work vehicle according to claim 1, wherein
the energy management requirement determination unit increases the energy management required power when the first travel direction and the second travel direction are different.

3. The work vehicle according to claim 2, wherein
the energy management requirement determination unit determines the target electricity storage amount on the basis of the vehicle speed.

4. The work vehicle according to claim 3, wherein
the energy management requirement determination unit changes the target electricity storage amount in response to the vehicle speed when the first travel direction and the second travel direction match.

5. The work vehicle according to claim 4, wherein
the energy management requirement determination unit reduces the target electricity storage amount in correspondence to an increase in an absolute value of the vehicle speed.

6. The work vehicle according to claim 5, wherein
the energy management requirement determination unit reduces the energy management required power in correspondence to a decrease in the difference between the target electricity storage amount and the current electricity storage amount.

7. The work vehicle according to claim 6, wherein
the energy management requirement determination unit determines the energy management required power for discharging the energy storage unit when the current electricity storage amount exceeds the target electricity storage amount.

8. The work vehicle according to claim 7, wherein
the energy storage unit is a capacitor.

9. The work vehicle according to claim 8, wherein
the power transmission device includes
an F-clutch that is connected when the vehicle is traveling forward;
an R-clutch that is connected when the vehicle is traveling backward; and
a gear mechanism that transmits rotation of the input shaft to the output shaft; and
the generator and the motor being connected to rotating elements of the gear mechanism.

10. The work vehicle according to claim 1, wherein
the energy management requirement determination unit determines the target electricity storage amount on the basis of the vehicle speed.

11. The work vehicle according to claim 10, wherein
the energy management requirement determination unit changes the target electricity storage amount in response to the vehicle speed when the first travel direction and the second travel direction match.

12. The work vehicle according to claim 11, wherein
the energy management requirement determination unit reduces the target electricity storage amount in correspondence to an increase in an absolute value of the vehicle speed.

13. The work vehicle according to claim 1, wherein
the energy management requirement determination unit reduces the energy management required power in correspondence to a decrease in the difference between the target electricity storage amount and the current electricity storage amount.

14. The work vehicle according to claim 13, wherein
the energy management requirement determination unit determines the energy management required power for discharging the energy storage unit when the current electricity storage amount exceeds the target electricity storage amount.

15. The work vehicle according to claim 1, wherein
the energy storage unit is a capacitor.

16. The work vehicle according to claim 1, wherein
the power transmission device includes
an F-clutch that is connected when the vehicle is traveling forward;
an R-clutch that is connected when the vehicle is traveling backward; and
a gear mechanism that transmits rotation of the input shaft to the output shaft; and
the generator and the motor being connected to rotating elements of the gear mechanism.

17. A control method for a work vehicle,
the work vehicle including an engine, a hydraulic pump driven by the engine, a work implement driven by hydraulic fluid discharged by the hydraulic pump, a travel device, a power transmission device that transmits a driving power from the engine to the travel device, a forward/backward travel switch operation device that receives an instruction for forward travel or backward travel from an operator, and a vehicle speed detecting unit that detects the vehicle speed of the travel device;
the power transmission device including an input shaft, an output shaft, a generator that receives the driving power from the engine, a motor that outputs the driving power to the travel device, and an energy storage unit that stores electricity generated by the generator;
the power transmission device being configured so that a rotation speed ratio of the output shaft with respect to the input shaft is changed by changing the rotation speed of the motor; and
the control method comprising:
a step for determining, on the basis of the difference between a target electricity storage amount and a current electricity storage amount in the energy storage unit, an energy management required power required by the power transmission device for charging the energy storage unit;
the step for determining the energy management required power includes including
a step for increasing the target electricity storage amount when a first travel direction according to an instruction by the operator that is received from the forward/backward travel switch operation device, and a second travel direction determined from the vehicle speed detected by the vehicle speed detecting unit, are different.

* * * * *